(12) United States Patent
Raczkowski et al.

(10) Patent No.: US 6,627,045 B2
(45) Date of Patent: Sep. 30, 2003

(54) SEAM FOR A CORRUGATOR BELT

(75) Inventors: Kaz Peter Raczkowski, Wynantskill, NY (US); Dennis Earle Sharpe, Castleton-on-Hudson, NY (US)

(73) Assignee: Albany International Corp., Albany, NY (US)

( * ) Notice: Subject to any disclaimer, the term of this patent is extended or adjusted under 35 U.S.C. 154(b) by 0 days.

(21) Appl. No.: 09/973,618

(22) Filed: Oct. 9, 2001

(65) Prior Publication Data

US 2003/0068950 A1 Apr. 10, 2003

(51) Int. Cl.$^7$ .............................. D03D 3/04; B31F 1/20
(52) U.S. Cl. ....................... 162/348; 162/904; 156/470; 156/304.4; 24/33 P; 198/844.2
(58) Field of Search ............................... 162/306, 358.2, 162/358.4, 348, 900, 901, 902, 903, 904, 361, 362; 474/253–258, 267–271; 28/110; 139/383 A, 383 AA, 425 A; 245/10; 24/33 A, 33 C, 33 P, 33 K, 31 L, 31 H, 31 R; 156/304.1, 304.3, 304.4, 304.5, 462, 470; 428/61; 198/844.1, 844.2, 845–853

(56) References Cited

U.S. PATENT DOCUMENTS

| 1,932,203 A | * | 10/1933 | Diamond | .................. 24/33 C |
| 2,893,007 A | * | 7/1959 | De Windt | .................. 29/428 |
| 4,344,209 A | * | 8/1982 | Harwood | .................. 24/31 R |
| 4,418,726 A | | 12/1983 | Josef et al. | ............. 139/383 A |
| 4,937,921 A | * | 7/1990 | Musil | .................. 24/33 C |
| 5,048,675 A | * | 9/1991 | Nadalutti | .................. 198/844.2 |
| 5,097,944 A | * | 3/1992 | Schick | .................... 198/844.2 |
| 5,217,415 A | | 6/1993 | Wasylezuck et al. | ........ 474/256 |
| 5,820,959 A | | 10/1998 | Whittaker | ..................... 426/61 |
| 6,186,209 B1 | * | 2/2001 | Lanthier | ....................... 156/470 |

FOREIGN PATENT DOCUMENTS

| DE | 840 968 | | 7/1949 |
| DE | 195 40 229 C1 | | 10/1995 |
| EP | 0 950 508 A2 | | 3/1999 |
| GB | 634028 | * | 3/1950 |

OTHER PUBLICATIONS

International Search Report issued by European Patent Office for counterpart international application PCT/US02/31104 and mailed Jan. 21, 2003.

* cited by examiner

Primary Examiner—Steven P. Griffin
Assistant Examiner—Eric Hug
(74) Attorney, Agent, or Firm—Frommer Lawrence & Haug, LLP; Ronald R. Santucci

(57) ABSTRACT

A corrugator belt for a corrugator machine has a base joined into endless from by means of a clipper seam. The base has a first end and a second end, and a first side and a second side. A strip of compressible material wraps around each of the first and second ends from the first side to the second side, and the clipper hooks for the clipper seam are installed over the strips at each end. The compressible material of the strips protrudes between adjacent clipper hooks to prevent corrugated paper board being manufactured using the corrugator belt from firmly contacting the clipper hooks and being marked and otherwise damaged by them.

24 Claims, 5 Drawing Sheets

SEAM FOR A CORRUGATOR BELT

BACKGROUND OF THE INVENTION

1. Field of the Invention

The present invention relates to the manufacture of corrugated paper board and, specifically, to the belts used on corrugator machines, where corrugated paper board is manufactured. More specifically, the present invention is a seam for joining a corrugator belt into endless form on a corrugator machine.

2. Description of the Prior Art

The manufacture of corrugated paper board, or box board, on corrugator machines is well-known in the art. On such machines, corrugator belts pull a web of corrugated paper board first through a heating zone, where an adhesive used to bond layers of the web together is dried or cured, and then through a cooling zone. Frictional forces between the corrugator belt, specifically its so-called board side which contacts the web, and the web are primarily responsible for pulling the latter through the machine.

Corrugator belts are required to be strong and durable, and to have good dimensional stability under the tension and high-temperature conditions encountered on a corrugator machine. The belts must also be comparatively flexible in the longitudinal, or machine, direction, while having sufficient rigidity in the cross-machine direction, so that they may be guided and driven around their endless paths on the machine. Traditionally, it has also been desirable for the belts to have a porosity sufficient to permit vapor to pass freely through them, but to be sufficiently incompatible with the moisture in the vapor to avoid their adsorption of condensed vapor, which could wet the surface of the corrugated paper board being manufactured.

As implied in the preceding paragraph, a corrugator belt takes the form of an endless loop when operating on a corrugator machine. In such form, the corrugator belt has a board side, as previously mentioned, and a back side, which is the inside of the endless loop. Frictional forces between the surface of the back side and the drive rolls of the corrugator machine move the corrugator belt, and frictional forces between the surface of the board side and the web of corrugated paper board pull the web through the machine.

Corrugator belts are generally flat-woven, multilayered fabrics, which are produced in lengths and widths appropriate for the corrugator machines on which they are to be installed. The ends of the fabrics are provided with seaming means, so that they may be joined to one another with a lacing cable when the corrugator belt is being installed on a corrugator machine.

One of the most common seams used for corrugator belts is the so-called clipper seam. This variety of seam comprises a plurality of generally U-shaped clipper hooks, which are installed in an alternating relationship on the ends of the corrugator belt, so that, when the two ends of the corrugator belt are brought together, they may be interdigitated to define a passage through which a lacing cable or pintle may be directed to secure one end to the other. The individual clipper hooks are of stiff metal wire, and have two parallel members, the upright portions of their "U" shapes, which are separated from one another by an amount substantially equal to, or slightly less than, the thickness of the corrugator belt, and which have mutually directed barbs, so that, when pushed onto the end of the corrugator belt, they are not readily removed. The two parallel members, which are on opposite sides of an end of the corrugator belt after the clipper hook has been installed, and which lie snugly against the opposite surfaces thereof, may be of equal or different length, and may therefor extend the same or different amounts longitudinally from the end of the corrugator belt.

In a typical corrugator machine, the heating zone comprises a series of hot plates across which the web of corrugated paper board is pulled by the corrugator belt. A plurality of weighted rollers or, alternatively, one or more air plenums within the endless loop formed by the corrugator belt, force the corrugator belt toward the hot plates, so that the corrugator belt may, in turn, press the corrugated paper board against the hot plates and generate frictional forces sufficient to pull the corrugated paper board thereacross. The same or similar means are also used in the cooling zone of the corrugator machine.

Unfortunately, the applied forces required for the corrugator belt to pull the corrugated paper board through the machine may cause the clipper seams to leave objectionable marks on the board or, even worse, may cause the seam to tear or break the board, leading to shutdowns and lost production.

One approach toward solving this problem has been to provide a protective flap to cover the clipper seam on the board side of the corrugator belt. Such a flap may be provided by slicing the ends of the corrugator belt in a plane parallel to the surfaces of the belt to form two plies. Then, approximately equal lengths of the board-side ply at one end and of the back-side ply at the other end are removed, giving each end a steplike appearance. A clipper seam is then formed using the back-side plies, and, because of the steplike overlap of the ends, is covered by a flap on the board side. The flap, of course, may require trimming to fit into the space produced when the corresponding length of board-side ply was removed from the other end. When the belt is installed on the corrugator machine, the flap is oriented in a direction opposite to that in which the belt will run on the machine.

While flaps produced in this manner do indeed reduce the marking of the board by the clipper seam, they gradually deteriorate during the running life of the belt, becoming worn and unraveling along their trailing edges to the point where, in the worst situations, the clipper seam is exposed and can mark the corrugated paper board.

The present invention is intended to overcome these problems experienced with the clipper seams of the prior art.

SUMMARY OF THE INVENTION

Accordingly, the present invention is a corrugator belt having a clipper seam which includes compressible material to prevent the individual clipper hooks making up the clipper seam from coming into firm contact with the corrugated paper board being manufactured on a corrugator machine.

More specifically, the present corrugator belt comprises a base having a first end and a second end, and a first side and a second side. A plurality of clipper hooks is attached to the base at each of the first and second ends, and are used to join the first and second ends to one another with a clipper seam to place the corrugator belt into the form of an endless loop. A compressible material is at each of said first and second ends between adjacent ones of said plurality of clipper hooks on at least one of the first and second sides of the base to prevent a corrugated paper board from being marked or damaged by the clipper seam. The compressible material may take the form of a strip which wraps around each end from the first side to the second side beneath the clipper hooks. The compressible material, as a consequence, protrudes between adjacent ones of the plurality of clipper hooks at each of the first and second ends to prevent a corrugated paper board from firmly contacting the clipper hooks and being marked or otherwise damaged by them.

The present invention will now be described in more complete detail with frequent reference being made to the figures identified immediately below.

DETAILED DESCRIPTION OF THE PREFERRED EMBODIMENTS

Figure 1:
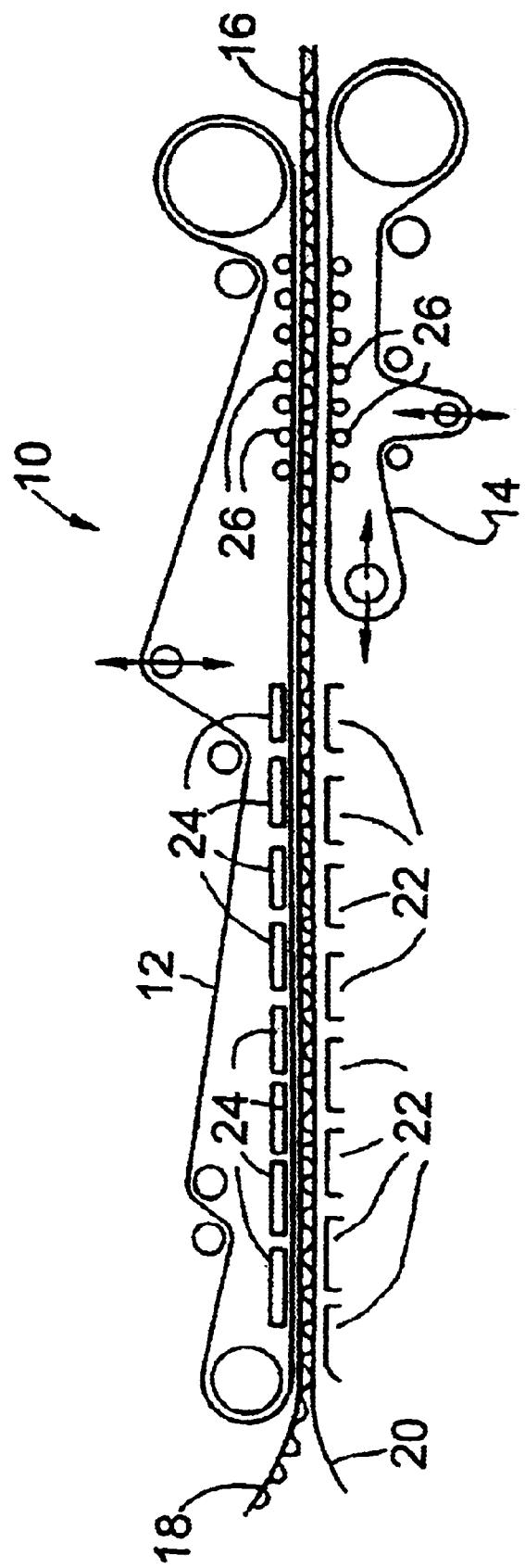
FIG. 1 is a schematic view of a portion of a corrugator machine.

Referring to FIG. 1, therein is shown a portion of a corrugator machine 10 having an upper corrugator belt 12 and a lower corrugator belt 14 which together pull corrugated paper board 16 through the machine 10. Either or both of belts 12, 14 may have the seam of the present invention.

The corrugated paper board 16 includes a first layer 18 and a second layer 20, which are to be joined to one another on the corrugator machine 10 by means of a suitable adhesive. First layer 18 may be recognized to be the output of a so-called single-facer machine, which corrugates a heavy paper sheet and joins it to an uncorrugated sheet. On corrugator machine 10, an uncorrugated sheet, second layer 20, is joined to the corrugated side of the output of the single-facer machine, first layer 18.

The first layer 18 and the second layer 20 are brought together at one end of the machine 10 and are pulled by the upper corrugator belt 12 across a series of hot plates 22 to dry and/or to cure the adhesive which bonds the paper layers together.

As illustrated, corrugator machine 10 includes a plurality of air bearings 24 from which high-velocity air flows are directed against the inside of the upper corrugator belt 12 toward the hot plates 22. The air bearings 24 thereby apply pressure from within the endless loop formed by upper corrugator belt 12, so that the upper corrugator belt 12 may pull the corrugated paper board 16 across the series of hot plates 22 under a selected amount of pressure at the same time as it pushes the corrugated paper board 16 against the series of hot plates. It should be understood by the reader that the upper corrugator belt 12, the corrugated paper board 16 and the series of hot plates 22 are separated from one another for the sake of clarity in FIG. 1.

After passing over the series of hot plates 22, the upper corrugator belt 12 and the lower corrugator belt 14 together pull the corrugated paper board 16 between them, maintaining the speed of the process operation and cooling the corrugated paper board 16. As may be observed, weighted rollers 26 may be deployed to apply pressure from within the endless loops formed by the upper corrugator belt 12 and the lower corrugator belt 14 toward one another, so that the corrugated paper board 16 may be held therebetween with some suitable degree of firmness.

Upon exit from between the upper corrugator belt 12 and the lower corrugator belt 14, the corrugated paper product 16 is cut and/or stacked as required.

Figure 2:
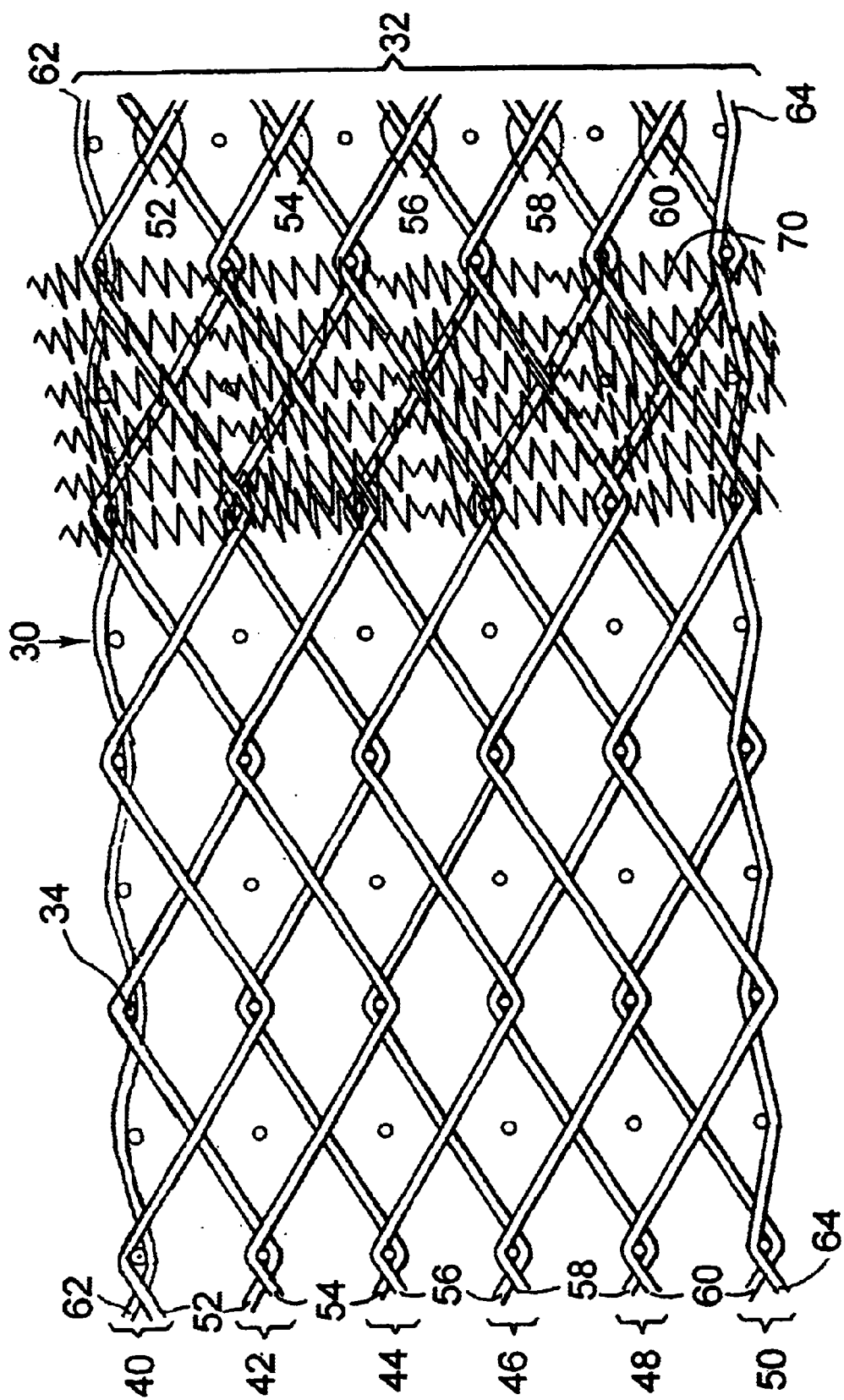
FIG. 2 is a cross-sectional view, taken in the longitudinal or warpwise direction, of a corrugator belt.

A cross-sectional view of a corrugator belt 30, which may be used as either upper corrugator belt 12 or lower corrugator belt 14, is presented in FIG. 2. The cross-sectional view is taken in a region not including either of the two ends of the belt 30, and is taken in the longitudinal or warpwise direction, and shows the weft or filling yarns in cross section. Because the embodiment shown is flat-woven, the warp yarns are oriented in the machine direction of a corrugator machine on which it would be used.

As depicted in FIG. 2, corrugator belt 30 includes a multilayer base fabric 32 comprising a plurality of layers of weft or filling yarns, each of which layers is connected to those adjacent thereto by a system of warp yarns.

With specific reference to the embodiment illustrated in FIG. 2, the multilayer base fabric 32 comprises six layers of weft, or filling yarns 34, wherein the weft, or filling, yarns 34 in each layer are disposed in a vertically stacked relationship with respect to those in other layers.

The first layer 40 and the second layer 42 of weft yarns 34 are joined or woven to each other by a first system of warp yarns 52. In like manner, the second layer 42 and the third layer 44 are woven together by a second system of warp yarns 54; the third layer 44 and the fourth layer 46 are woven together by a third system of warp yarns 56; the fourth layer 46 and the fifth layer 48 are woven together by a fourth system of warp yarns 58; and, finally, the fifth layer 48 and the sixth layer 50 are woven together by a fifth system of warp yarns 60.

Additional warp yarns 62 weave with the weft yarns 34 of the first layer 40 in a plain weave, and, likewise, additional warp yarns 64 weave with the weft yarns 34 of the sixth layer 50, also in a plain weave, to fill out the surfaces of the base fabric 32.

The weave pattern shown in FIG. 2, however, should be understood to be an example of the multilayer weaves which may be employed in the practice of the present invention and should not be construed to limit such practice to the specific weave shown. In like manner, the corrugator belt may be manufactured using a base in the form of a spiral coil carrier, such as those shown in U.S. Pat. Nos. 4,395,308; 4,662,994; and 4,675,229, the teachings of all three of which are incorporated herein by reference, rather than a base like multilayer base fabric 32.

Spiral coil carriers are well-known to those of ordinary skill in the arts of papermaker's dryer fabrics and corrugator belts, and include a plurality of hinge yarns, all of the hinge yarns extending in a common direction, and a plurality of spiral coils disposed in a common plane in a side-by-side relationship, each of the coils extending in the common direction. Adjacent coils of the spirals are intermeshed and held together in intermeshing relationship by at least one of the hinge yarns.

The base fabric 32 may be woven from warp and filling yarns comprising yarns of any of the varieties used in the manufacture of paper machine clothing and industrial process fabrics. That is to say, the base fabric 32 may include monofilament or multifilament yarns of any of the synthetic polymeric resins used by those skilled in the art, such as polyester, polyamide, and polyethylene or polybutylene terephthalate. Spun yarns of natural or synthetic staple fibers may also be included, so long as they are capable of withstanding the temperatures characteristic of corrugator machines. Spun polyester, polyamide or polyaramid yarns are but a few examples.

One or both sides of the base fabric 32 may be needled with a web 70 of staple fiber material in such a manner that the fibers are driven into the structure of the base fabric 32. One or more layers of staple fiber material may be needled into one or both sides of the base fabric 32, and the web 70 may extend partly or completely through the base fabric 32.

The webs of staple fiber material used for this purpose may be of polyester, polypropylene, polyamide or acrylic fibers. For the sake of clarity, the web 70 is included in only a portion of FIG. 2.

Where a spiral coil carrier of the variety described above is used instead of base fabric 32, one or both of its two sides may be needled with a web of staple fiber material in such a manner that the fibers are driven into its structure. One or more layers of the staple fiber material may be needled into one or both sides of the spiral coil carrier, and the web may extend partly or completely through the spiral coil carrier.

Figure 3:
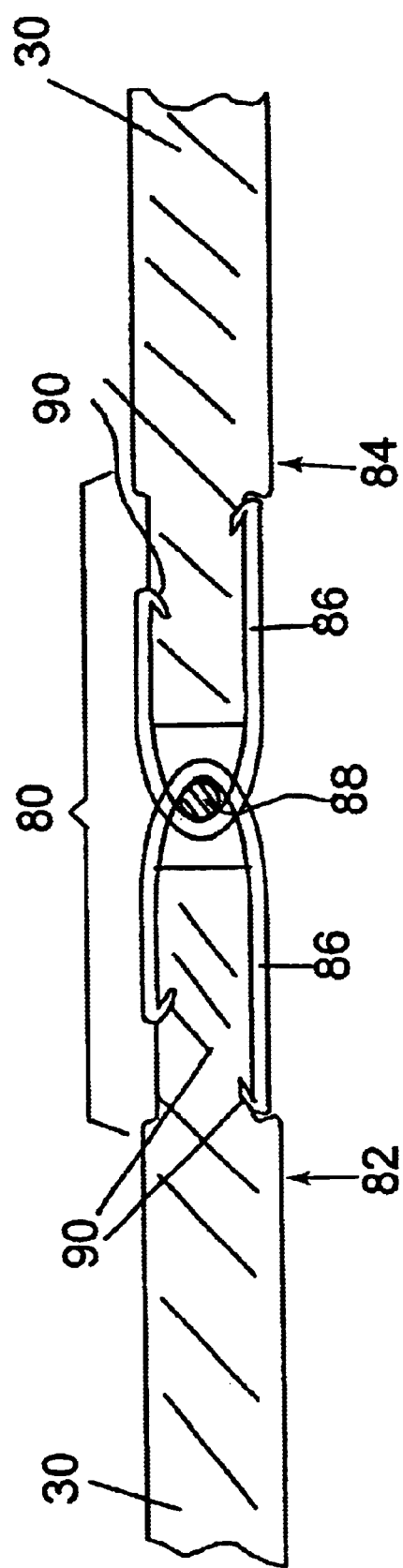
FIG. 3 is a cross-sectional view of a clipper seam of the prior art.

FIG. 3 is a cross-sectional view of a clipper seam 80 of the prior art. Corrugator belt 30 has a first end 82 and a second end 84 on which is installed and disposed a plurality of clipper hooks 86 in an alternating relationship as described above. It will be noted that the first and second ends 82,84 have a thickness less than that of the rest of the belt 30, so that the plurality of clipper hooks 86 are even with or slightly below the surface plane of the belt 30. When the first end 82 and the second end 84 are brought together during the installation of the corrugator belt 30 on a corrugator machine 10, the clipper hooks 86 along the ends 82, 84 are interdigitated with one another to define a passage through which a lacing cable 88, in other words, a pintle, may be directed to secure the ends 82, 84 to one another, thereby placing the corrugator belt 30 into the form of an endless loop. As one may readily appreciate, the barbs 90 on the clipper hooks 86 inhibit their removal from the ends 82, 84 of the corrugator belt 30.

It will also be noted in FIG. 3 that clipper hooks 86 in clipper seam 80 are exposed on the two sides of the corrugator belt 30, one of those sides, of course, being the board side which comes into contact with the corrugated paper board on the corrugator machine. As such, the clipper hooks 86, being of stiff metal wire, can leave objectionable marks on the corrugated paper board being manufactured on the corrugator machine 10.

Figure 4:
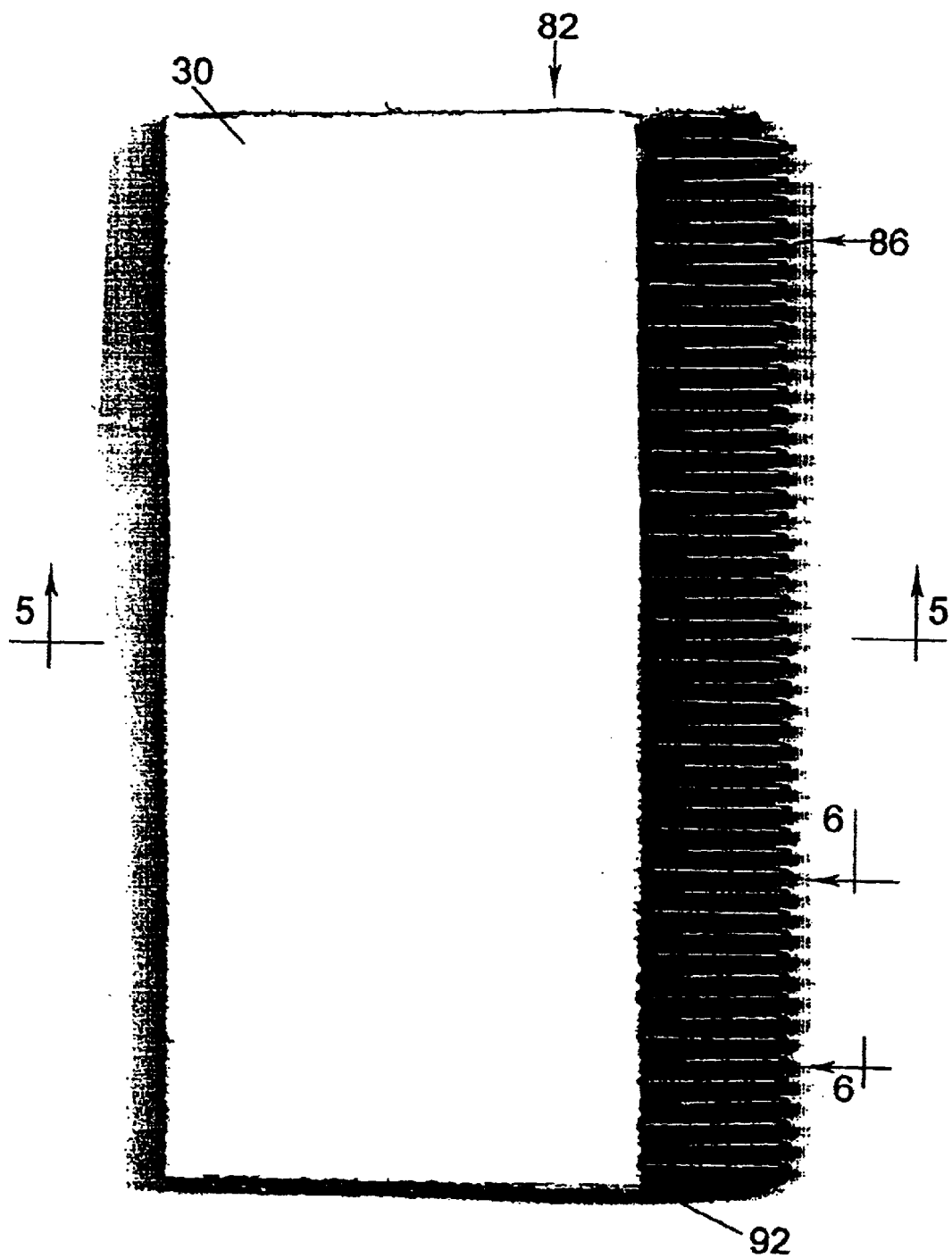
FIG. 4 is a plan view of an end of a corrugator belt modified in accordance with the present invention.

FIG. 4 is a plan view of the first end 82 of the corrugator belt 30. The first end 82 has been modified in accordance with one embodiment of the present invention to alleviate the marking of a corrugated paper board by the clipper hooks 86. Specifically, a strip 92 of compressible material runs across the first end 82, as well as across the second end 84 not shown, in the hook anchoring area within the clipper hooks 86. Because the strip 92 is of a compressible material, it protrudes away from the corrugator belt 30 in the spaces between adjacent clipper hooks 86 so as to prevent any firm contact therewith by a corrugated paper board.

Figure 5:
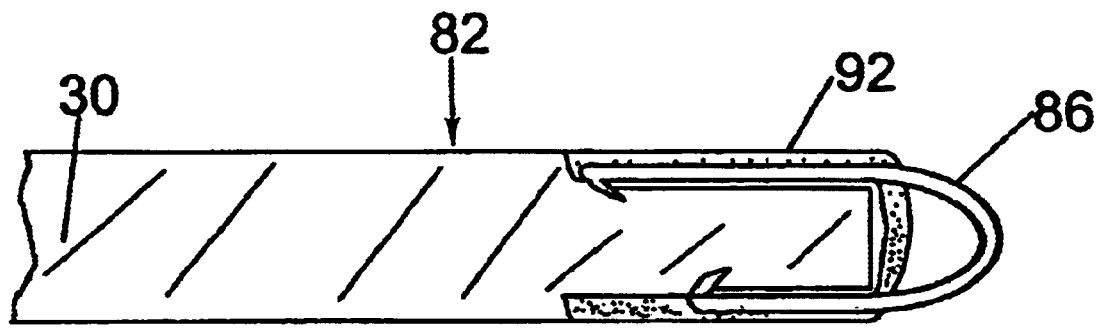
FIG. 5 is a cross-sectional view of the corrugator belt taken as indicated by line 5—5 in FIG. 4.
Figure 6:
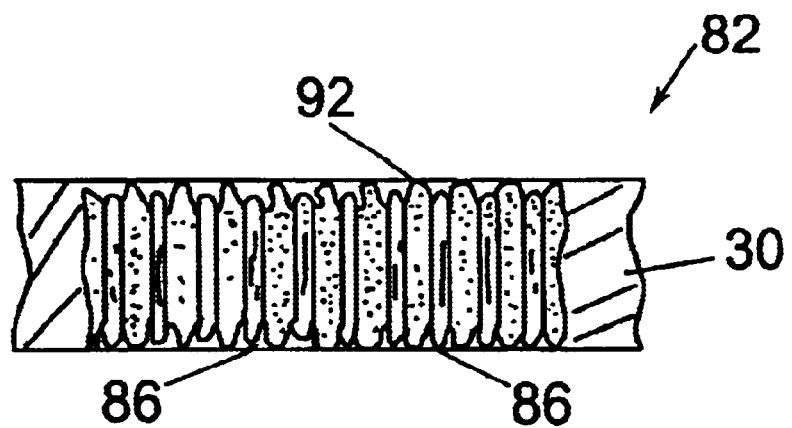
FIG. 6 is a view of an end of the corrugator belt taken as indicated by line 6—6 in FIG. 4.

This may be appreciated upon reference to FIGS. 5 and 6. FIG. 5 is a cross-sectional view taken as indicated by line 5—5 in FIG. 4. The cross-sectional view is taken in the longitudinal, or machine, direction in the space between two adjacent clipper hooks 86. The strip 92 of compressible material wraps around the first end 82 of the corrugator belt 30 beneath the clipper hooks 86, and protrudes outward of the clipper hooks 86 in the spaces therebetween.

FIG. 6 is a view of first end 82, taken as shown by line 6—6 in FIG. 4, showing the strip 92 of compressible material protruding between the adjacent clipper hooks 86 to prevent any firm contact therewith by the corrugated paper board.

Preferably, the strip 92 of compressible material is disposed round the ends 82,84 before the clipper hooks 86 are installed thereon, so that the clipper hooks 86 may be pushed onto the ends 82,84 over the strips 92. Alternatively, the strips 92 may be threaded under the clipper hooks 86 across the ends 82,84 following the installation of the clipper hooks 86 there.

The strips 92 of compressible material may be of any material having sufficient abrasion resistance, as well as heat, moisture and compression resistance to withstand the operating conditions characteristic of a corrugator machine. As such, the compressible material could be a polymeric foam, a woven fabric or a nonwoven fabric such as a spun-bond web. A loop strip, normally used as part of a hook-and-loop (VELCRO®) fastener, has been used as the strip 92 of compressible material with excellent results.

Alternatively, the strips 92 of compressible material may be strips of silicone rubber or polyurethane, optionally reinforced with a fiber or woven material. Further, the strips 92 may be of needlepunched, hydroentangled or airlaid fibrous material, preferably having some loft or orientation in the "z" or thickness direction. Finally, the strips 92 may be of a fiber-reinforced meltable polymeric material.

Moreover, instead of strips 92 of compressible material, the first and second ends 82,84 may be needled with additional staple fiber material to provide compressible material in those regions. Alternatively, a caulk-like material or foam may be applied to the first and second ends 82,84 after the ends 82,84 have been joined to one another on a corrugator machine. A silicone rubber compound, particularly a room-temperature-vulcanizing silicone rubber, may be used for this purpose.

Modifications to the invention described above would be obvious to those of ordinary skill in the art, yet would not bring the invention so modified beyond the scope of the appended claims.

What is claimed is:

1. A corrugator belt for a corrugator machine, said corrugator belt comprising:

a base having a first end and a second end, and a first side and a second side;

a plurality of clipper hooks attached to each of said first end and said second end, said clipper hooks being used to join said first and second ends to one another with a clipper seam to place said corrugator belt into the form of an endless loop, said clipper hooks extending beyond the first and second end and being at a spaced distance from one another; and a compressible material at each of said first end and said second end, said compressible material substantial extending the spaced distance between adjacent ones of said plurality of clipper hooks on at least one of said first and second sides of said base beyond the first and second end to prevent a corrugated paper board from being marked or damaged by said clipper hooks.

2. The corrugator belt as claimed in claim 1, wherein said base is a multilayer base fabric having a plurality of layers of weft yarns and a plurality of systems of warp yarns, each of said systems weaving between said weft yarns of two adjacent layers of said plurality of layers, so that all of said plurality of layers of weft yarns are joined together into said base fabric.

3. The corrugator belt as claimed in claim 2, wherein said plurality of layers of weft yarns is six such layers.

4. The corrugator belt as claimed in claim 1, wherein said base is a spiral coil carrier including a plurality of hinge yarns, all of said hinge yarns extending in a common direction, and a plurality of spiral coils disposed in a common plane in a side-by-side relationship, each of said spiral coils extending in a common direction and adjacent spiral coils being intermeshed with one another and held together in intermeshing relationship by at least one of said hinge yarns.

5. The corrugator belt as claimed in claim 1, further comprising a web of staple fiber material needled into one of said first and second sides of said base.

6. The corrugator belt as claimed in claim 1, further comprising a web of staple fiber material needled into both of said first and second sides of said base.

7. The corrugator belt as claimed in claim 1 wherein said compressible material is a strip of compressible material wrapping around said first and second ends from said first side to said second side beneath said plurality of clipper hooks.

8. The corrugator belt as claimed in claim 7, wherein said strip of compressible material is a polymeric foam strip.

9. The corrugator belt as claimed in claim 7, wherein said strip of compressible material is a strip of woven fabric.

10. The corrugator belt as claimed in claim 7, wherein said strip of compressible material is a strip of non-woven fabric.

11. The corrugator belt as claimed in claim 7, wherein said strip of compressible material is a loop strip for a hook-and-loop fastener.

12. The corrugator belt as claimed in claim 7, wherein said strip of compressible material is a strip of silicone rubber.

13. The corrugator belt as claimed in claim 12, wherein said strip of silicone rubber is reinforced with a fiber material.

14. The corrugator belt as claimed in claim 12, wherein said strip of silicone rubber is reinforced with a woven material.

15. The corrugator belt as claimed in claim 7, wherein said strip of compressible material is a strip of polyurethane.

16. The corrugator belt as claimed in claim 15, wherein said strip of polyurethane is reinforced with a fiber material.

17. The corrugator belt as claimed in claim 15, wherein said strip of polyurethane is reinforced with a woven material.

18. The corrugator belt as claimed in claim 7, wherein said strip of compressible material is a strip of fibrous material.

19. The corrugator belt as claimed in claim 7, wherein said strip of compressible material is a strip of fiber-reinforced meltable polymeric material.

20. The corrugator belt as claimed in claim 1, wherein said compressible material is staple fiber material needled into said first and second ends.

21. The corrugator belt as claimed in claim 1, wherein said compressible material is a caulk material or foam applied over said plurality of clipper hooks at said first and second ends.

22. The corrugator belt as claimed in claim 21, wherein said caulk material or foam is a silicone rubber compound.

23. A corrugator belt for a corrugator machine, said corrugator belt comprising:

a base having a first end and a second end, and a first side and a second side;

a plurality of clipper hooks attached to each of said first end and said second end, said clipper hooks being used to join said first and second ends to one another with a clipper seam to place said corrugator belt into the form of an endless loop;

a compressible material at each of said first end and said second end, said compressible material being between adjacent ones of said plurality of clipper hooks on at least one of said first and second sides of said base to prevent a corrugated paper board from being marked or damaged by said clipper hooks;

said compressible material is a strip of compressible material wrapping around said first and second ends from said first side to said second side beneath said plurality of clipper hooks; and said strip of compressible material is a loop strip for a hook-and-loop fastener.

24. A corrugator belt for a corrugator machine, said corrugator belt comprising:

a base having a first end and a second end, and a first side and a second side;

a plurality of clipper hooks attached to each of said first end and said second end, said clipper hooks being used to join said first and second ends to one another with a clipper seam to place said corrugator belt into the form of an endless loop;

a compressible material at each of said first end and said second end, said compressible material being between adjacent ones of said plurality of clipper hooks on at least one of said first and second sides of said base to prevent a corrugated paper board from being marked or damaged by said clipper hooks; and said compressible material is staple fiber material needled into said first and second ends.

* * * * *